United States Patent
Nguyen et al.

(10) Patent No.: US 8,140,514 B2
(45) Date of Patent: Mar. 20, 2012

(54) AUTOMATIC CLASSIFICATION OF DEFECTS

(75) Inventors: Khanh Nguyen, Wichita, KS (US);
Seonmi Anderson, Bel Aire, KS (US);
Michael L. Peterson, El Dorado, KS (US)

(73) Assignee: LSI Corporation, Milpitas, CA (US)

( * ) Notice: Subject to any disclaimer, the term of this patent is extended or adjusted under 35 U.S.C. 154(b) by 612 days.

(21) Appl. No.: 12/323,625

(22) Filed: Nov. 26, 2008

(65) Prior Publication Data

US 2010/0131450 A1 May 27, 2010

(51) Int. Cl.
*G06F 17/30* (2006.01)

(52) U.S. Cl. ........ 707/708; 707/736; 707/738; 707/750; 707/758; 707/769; 707/771

(58) Field of Classification Search .................. 707/706, 707/708, 723, 736, 738, 750, 758, 769, 771
See application file for complete search history.

(56) References Cited

U.S. PATENT DOCUMENTS

| | | | | |
|---|---|---|---|---|
| 6,246,787 B1* | 6/2001 | Hennessey et al. | ........... | 382/141 |
| 6,314,367 B1* | 11/2001 | Ohler et al. | .................. | 701/208 |
| 6,484,128 B1* | 11/2002 | Sekiya et al. | ................. | 702/185 |
| 7,020,536 B2* | 3/2006 | Lin et al. | ........................ | 700/110 |
| 7,047,239 B2* | 5/2006 | French et al. | .......................... | 1/1 |
| 7,071,011 B2* | 7/2006 | Lin | .................................... | 438/5 |
| 7,149,928 B2* | 12/2006 | van Os | ........................ | 714/38.13 |
| 7,257,743 B2* | 8/2007 | Glerum et al. | .................. | 714/48 |
| 7,836,346 B1* | 11/2010 | Davidov et al. | ................ | 714/38.1 |
| 7,890,814 B2* | 2/2011 | Zhang et al. | ..................... | 714/45 |
| 2002/0059198 A1* | 5/2002 | Yamashita et al. | ................ | 707/3 |
| 2003/0066049 A1* | 4/2003 | Atwood et al. | ............... | 717/101 |
| 2005/0177264 A1* | 8/2005 | Lin et al. | ........................ | 700/110 |
| 2006/0136784 A1* | 6/2006 | Prescott et al. | .................. | 714/38 |
| 2006/0156077 A1* | 7/2006 | Altaf et al. | ....................... | 714/57 |
| 2006/0242706 A1* | 10/2006 | Ross | ............................... | 726/23 |
| 2007/0074149 A1* | 3/2007 | Ognev et al. | ................... | 717/101 |
| 2007/0100662 A1* | 5/2007 | Suwalski et al. | .................. | 705/2 |
| 2007/0168343 A1* | 7/2007 | Best et al. | ......................... | 707/5 |
| 2007/0250816 A1* | 10/2007 | Rose | ............................. | 717/124 |
| 2008/0127200 A1* | 5/2008 | Richards et al. | ............. | 718/106 |
| 2008/0141221 A1* | 6/2008 | Benesovska et al. | ......... | 717/124 |
| 2008/0162688 A1* | 7/2008 | Reumann et al. | ............. | 709/224 |
| 2009/0077231 A1* | 3/2009 | Sakai et al. | .................... | 709/224 |
| 2010/0234976 A1* | 9/2010 | Kostyk et al. | ................. | 700/105 |

* cited by examiner

*Primary Examiner* — Thanh-Ha Dang
(74) *Attorney, Agent, or Firm* — Christopher P. Maiorana, PC

(57) ABSTRACT

A method of automatically classifying defects. The method generally includes the steps of (A) receiving information for a current defect, (B) extracting field values from the current defect, (C) counting a number of occurrences of one or more keywords in the current defect, (D) determining one or more new keywords occurring in the current defect and storing the one or more new keywords in a database and (E) creating one or more linkages in the database between a first record corresponding to the current defect and one or more second records corresponding to previous defects based upon one or more similarities between the first and the second records.

20 Claims, 3 Drawing Sheets

AUTOMATIC CLASSIFICATION OF DEFECTS

FIELD OF THE INVENTION

The present invention relates to product development and testing generally and, more particularly, to a method and/or apparatus for implementing automatic classification of defects.

BACKGROUND OF THE INVENTION

Within corporate development/testing environments, one of the primary actions that takes place is the discovery and reporting of defects found in a system or software application under test. As defects are found, the defects are often stored in a defect-tracking database, along with various static attributes further describing the defect. When the incoming defect workload reaches a level where the capacity of the development team to work the defects starts to be exceeded, some sort of "triage" system often needs to be implemented, in order to prioritize the defects, and to ensure that the defects have the required information.

The problem with existing approaches is that the defects tend to be classified strictly based upon the associated static attributes. While knowing that a defect was written against a particular part of the product (such as a particular application bundle), or was written up while doing a certain kind of testing is useful, such an approach does not always provide as detailed a picture as is possible with the existing data. Since the classification of defects is static, there is no easy way to spot trends in the types of defects that are being written up.

Existing approaches classify and/or triage the defects using a manual process that is based on static attributes. The existing approaches involve having engineers dedicated to examining incoming defects, determining whether or not the defects have the appropriate information, and then passing the defects along to the appropriate development team. Since the existing approach is essentially manual, there is added time that is required to get a defect through a lifecycle of the defect.

The overhead of development and test leads to assigning and re-assigning defects to various developers which results in less efficiency in the overall development/test process. Also, the classification of defects is often left up to whoever is assigning the defects. Thus, the assignment of defects is dependent upon the knowledge of the individual assigner. Depending upon the experience level of the assigner, assignments may not be done efficiently (i.e., may go to a less-appropriate developer, etc.). Also, the static classification method for defects does not accurately show trends in change requests (CRs). History of defects is available, but could be made more useful. Also, engineers dedicated to triage cannot be used for other development and testing activities, thus requiring a company to spend more money on headcount to replace the engineers carrying out the triage activity.

SUMMARY OF THE INVENTION

The present invention concerns a method, which in an example embodiment automatically classifies defects, including the steps of (A) receiving information for a current defect, (B) extracting field values from the current defect, (C) counting a number of occurrences of one or more keywords in the current defect, (D) determining one or more new keywords occurring in the current defect and storing the one or more new keywords in a database and (E) creating one or more linkages in the database between a first record corresponding to the current defect and one or more second records corresponding to previous defects, based upon one or more similarities between the first and the second records.

The objects, features and advantages of the present invention include providing a method and/or apparatus for implementing automatic classification of defects that may (i) provide a database containing a list of relevant facts/relationships gathered from defects in a defect-tracking system, (ii) provide an agent that collects and analyzes data from defects, and stores the data in the database, (iii) create relationships between defects, based on fields, keywords and assignment history, (iv) save time by avoiding manual classification, (v) assign properly-classified defects to appropriate developers, (vi) reduce or eliminate time wasted on reassignment, (vii) maintain a history of similar defects, (viii) keep track of defect resolvers for certain types of defects for future cross training, (ix) classify defects in a timely manner, (x) automatically assign the defects to appropriate developers without human intervention, (xi) provide a configurable triage system to look at specific defect types, (xii) provide configurable rules for routing specific defect types to specific teams and/or (xiii) provide configurable rules for routing specific defect types to specific developers.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
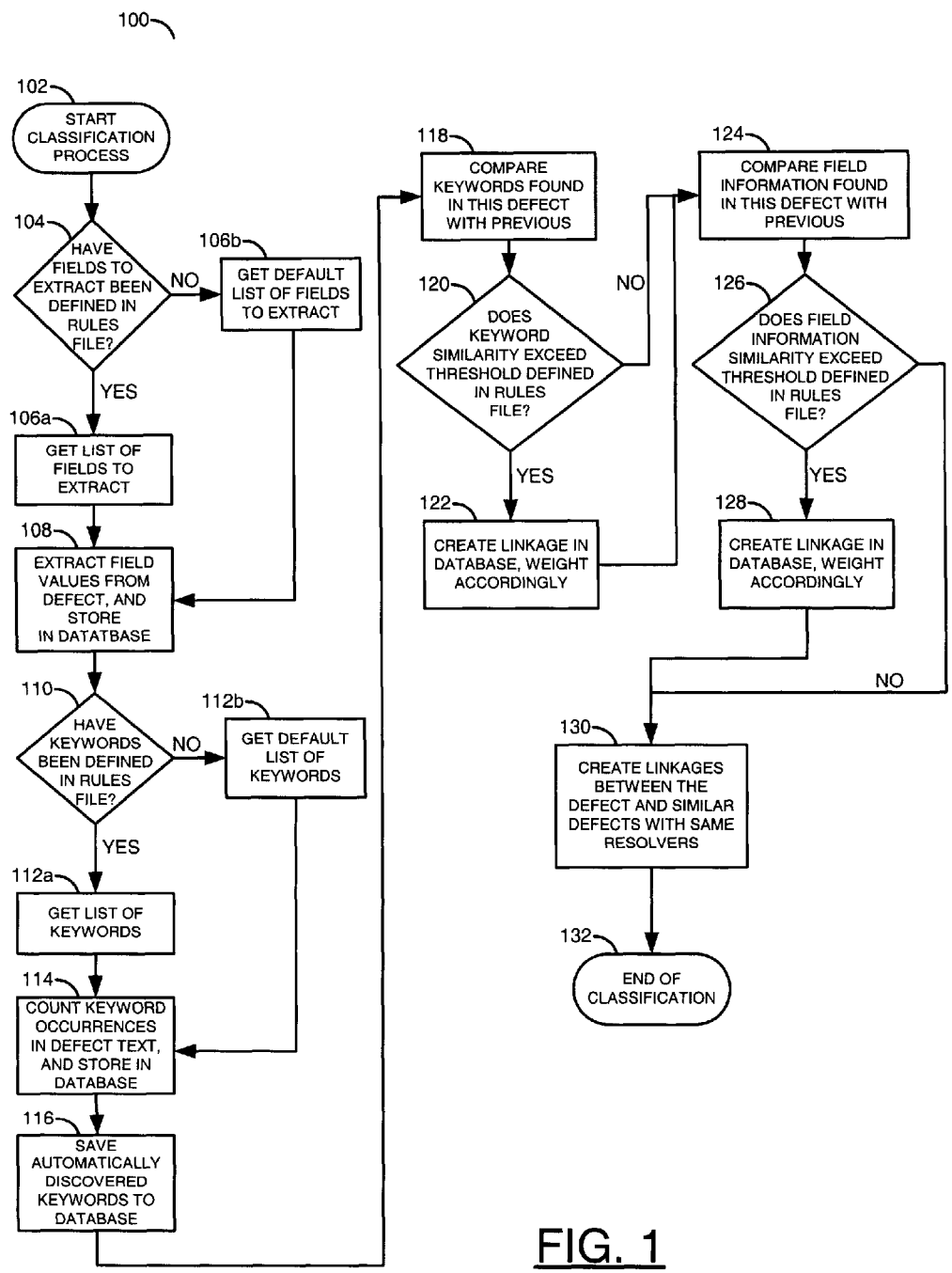
FIG. 1 is a flow diagram shown illustrating a defect classification process in accordance with the present invention.

Referring to FIG. 1, a flow diagram is shown illustrating an automatic defect classification process 100 in accordance with a preferred embodiment of the present invention. In one example, the process 100 may comprise a step 102, a step 104, steps 106a and 106b, a step 108, a step 110, steps 112a and 112b, a step 114, a step 116, a step 118, a step 120, a step 122, a step 124, a step 126, a step 128, a step 130 and a step 132. Each of the steps 102-132 may be implemented as a step, a process, a subroutine, a state in a state diagram, or another type of step/state and/or process and/or state. The step 102 may be implemented as a classification start process. The step 104 may be implemented as a decision process. The step 106a may be implemented as a field list retrieval process. The step 106b may be implemented as a default field list retrieval process. The step 108 may be implemented as a field value extraction process. The step 110 may be implemented as a decision process. The step 112a may be implemented as a keyword list retrieval process. The step 112b may be implemented as a default keyword list retrieval process. The step 114 may be implemented as a keyword detection process. The step 116 may be implemented as a new keyword saving process. The step 118 may be implemented as a comparison process. The step 120 may be implemented as a decision process. The step 122 may be implemented as a linkage creation process. The step 124 may be implemented as a comparison process. The step 126 may be implemented as a decision process. The step 128 may be implemented as a linkage creation process. The step 130 may be implemented as a linkage creation process. The step 132 may be implemented as a classification termination process.

The process 100 generally begins in the step 102 with initiation of the classification process. The process 100 moves to the step 104 where a determination is made as to whether or not fields to be extracted have been defined (e.g., in a rules file, in a configuration file, etc.). When fields to be extracted have been defined, the process 100 moves to the step 106*a*. When no fields to be extracted have been defined, the process 100 moves to the step 106*b*.

In the step 106*a*, a list of the fields to be extracted is retrieved (e.g., from the rules file). In the step 106*b*, a list of default fields to extract may be retrieved (e.g., from a configuration file, a default rules file, etc.). In one example, providing a set of default fields to be extracted allows the classification system in accordance with the present invention to be used as a turn key system. For example, a user may customize the fields to be extracted and/or use the system without customization (e.g., use default values). The term default is used herein to generally refer to objects (e.g., attributes, fields, parameters, values, keywords, etc.) that are predefined in a classification system in accordance with the present invention. In one example, the default fields may include one or more fields that may be common to a number of defect types and/or reporting strategies. When the appropriate list of fields to be extracted has been retrieved, the process 100 generally moves from either the step 106*a* or the step 106*b* to the step 108.

In the step 108, the process 100 extracts values from the listed fields of the defect and stores the field values (e.g., in a database). Once the field values have been extracted from the defect and stored, the process 100 moves to step 110. In the step 110, the process 100 determines whether or not any keywords have been defined (e.g., in the rules file). When keywords have been defined, the process 100 may move to the step 112*a*. When no keywords have been defined, the process 100 may move to the step 112*b*. In the step 112*a*, the process 100 retrieves a custom list of keywords (e.g., from the rules file). In the step 112*b*, the process 100 retrieves a default list of keywords. When the appropriate list of keywords has been retrieved, the process 100 moves from either the step 112*a* or the step 112*b* to the step 114.

In the step 114, the process 100 counts occurrences in the defect text of the keywords from the retrieved list and stores the occurrences in the database. In one example, the information stored may comprise the list of keywords currently defined in the data store that occur in the fields searched in the current defect, and the number of times each one of the keywords is detected. Once the occurrences of the keywords from the list have been counted and stored, the process 100 moves to the step 116. In the step 116, the process 100 may be configured to automatically determine additional keywords and save the automatically discovered keywords to the database. Selection of a word as a keyword/token may be based, for example, on how frequently the word appears in the description, and whether or not the word is a short, common word (e.g., "it", "on", etc.). Proper nouns, hyphenated phrases and the like may be prime candidates to be automatically converted into keywords. Additional rules may be implemented accordingly to further process the defect. Upon completion of the keyword related processing, the process 100 moves to the step 118.

In the step 118, the keywords found in the current defect are compared with records corresponding to previous defects and previous defects associated with similar keywords are identified. When the comparison between the current defect and the previous defects is complete, the process 100 moves to the step 120. In the step 120, the process 100 determines whether any similarities between the keywords found in the current defect and the previous defects exceed a threshold. In one example, the threshold may be user defined (e.g., in the rules file). In another example, a default threshold may be implemented. When the keyword similarity exceeds the threshold, the process 100 may move to the step 122. When the keyword similarity does not exceed the threshold, the process 100 may move to the step 124. In the step 122, the process 100 may be configured to create linkages in the database between the current defect and the previous defects having keyword similarities that exceeded the threshold. The process 100 may be further configured to weight the linkages accordingly, based on the similarities. Once the keyword-based linkages have been created in the database, the process 100 moves to the step 124.

In the step 124, field information found in the current defect is compared to field information extracted from the previous defects and previous defects associated with similar field values may be identified. Once the comparison has been completed, the process 100 moves to the step 126. In the step 126, field information similarity may be checked to determine whether a threshold is exceeded. In one example, the threshold may be user defined (e.g., in the rules file). In another example, a default threshold may be implemented. In one example, separate thresholds may be implemented for the comparison of keywords and the comparison of field information. For example, a first threshold (e.g., keyword similarity threshold) and a second threshold (e.g., field value similarity threshold) may be implemented.

When the similarity between the field information of the current defect and the field information of one or more previous defects exceeds the respective threshold, the process 100 may move to the step 128. When the field information similarity does not exceed the respective threshold, the process 100 may move to the step 130. In the step 128, the process 100 may create linkages in the database between the records corresponding with the current defect and records corresponding with the previous defects with field information similarities that exceed, for example, the field value similarity threshold.

The process 100 may be further configured to weight the linkages accordingly for the field information. Once the linkages have been created and/or weighted, the process 100 may move to the step 130. In the step 130, the process 100 may create linkages between the current defect and similar defects with the same resolvers (e.g., development team, developer, etc.). Once the resolver-based linkages have been created, the process 100 may move to the step 132 and terminate.

Figure 2:
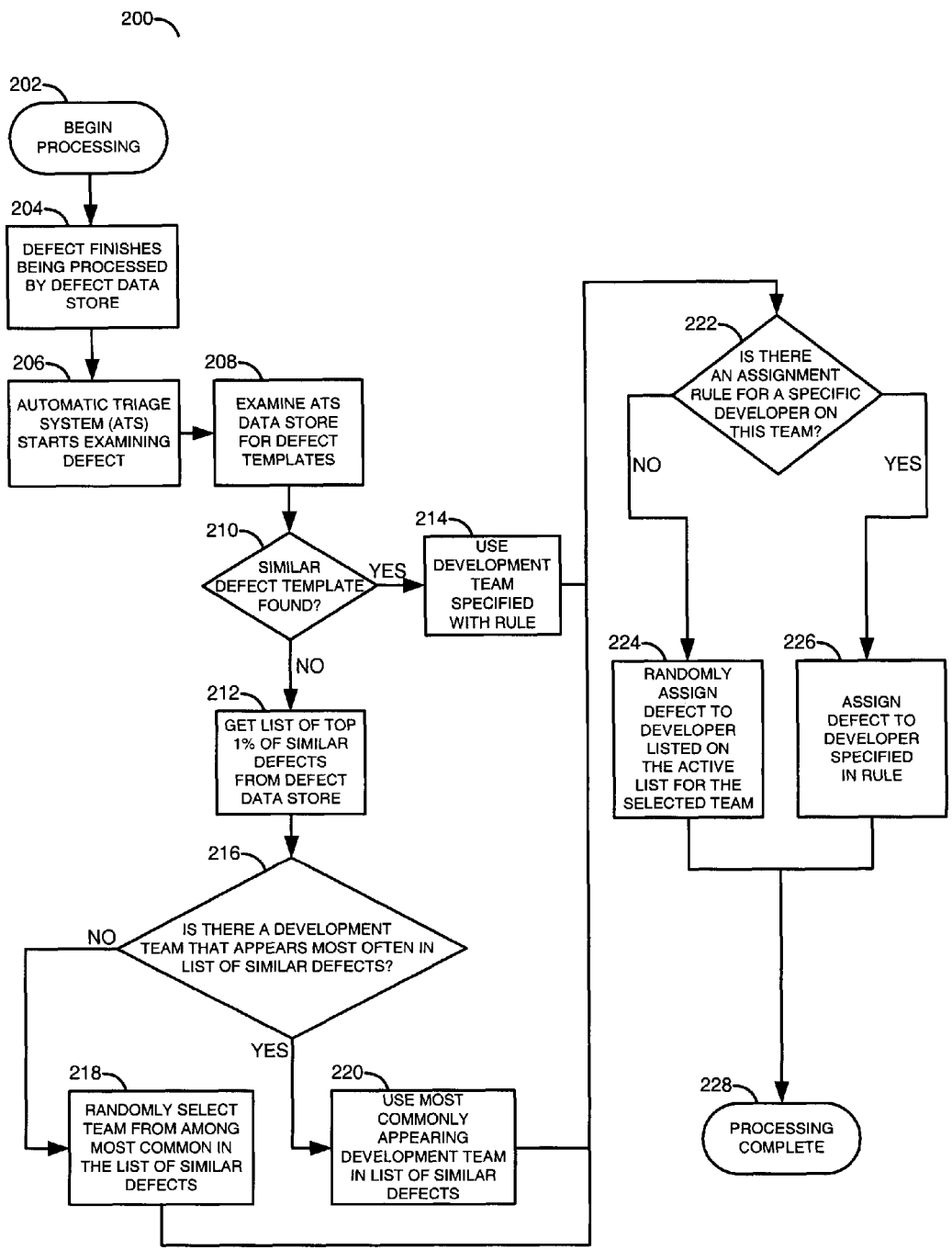
FIG. 2 is a flow diagram shown illustrating an automatic triage/assignment process in accordance with the present invention.

Referring to FIG. 2, a flow diagram is shown illustrating an automatic triage assignment process in accordance with another preferred embodiment of the present invention. The process 200 may comprise a step 202, a step 204, a step 206, a step 208, a step 210, a step 212, a step 214, a step 216, a step 218, a step 220, a step 222, a step 224, a step 226 and a step 228. The steps 202-228 may be implemented as a step, a process, a subroutine, a state in a state diagram, or another type of step/state and/or process and/or state. The step 202 may be implemented as a processing start process. The step 204 may be implemented as a defect processing process. The step 206 may be implemented as an automatic defect examination process. The step 208 may be implemented as a template examination process. The step 210 may be implemented as a decision process. The step 212 may be implemented as a retrieval process. The step 214 may be implemented as a development team assignment process. The step 216 may be implemented as a decision process. The step 218 may be implemented as a random selection process. The step 220 may be implemented as a rule-based selection process. The step 222 may be implemented as a decision process. The step 224 may be implemented as a random assignment process. The step 226 may be implemented as a rule-based assignment process. The step 228 may be implemented as a termination process.

The process 200 may begin in the step 202 with arrival of a new current defect in the classification system or defect-tracking system. The process 200 moves to the step 204 to process the current defect received by the classification system. In one example, the processing of the current defect may be performed using a process similar to the process 100 (described above in connection with FIG. 1). When processing of the current defect is finished, the process 200 may move to the step 206. In the step 206, the process 200 examines the results from the step 204 (e.g., similarity data, etc.) generated through the processing of the current defect by the classification system. The process 200 continues in the step 208 where the database is examined (e.g., queried) for other defect templates similar to the current defect. Once the database has been examined, the process 200 moves to the step 210. In the step 210, a determination is made whether any other similar defect templates are present in the database. When a similar defect template is not found, the process 200 moves to the step 212. When a similar defect template is found, the process 200 moves to the step 214 and selects a development team based, for example, upon information in the rule file.

In the step 212, the process 200 retrieves a list containing a number of similar defects from the defect database. In one example, the number of similar defects in the list may be set by a constant (e.g., top 10). In another example, the number of similar defects in the list may be set as a percentage (e.g., the top 1%). When the list of similar defects has been generated, the process 200 may move to the step 216. In the step 216, a determination is made whether there is a development team that appears most often in the list of similar defects. If no particular team appears most often, the process 200 may move to the step 218. If a particular team is the most often appearing team, the process 200 may move to the step 220. In the step 218, the process 200 randomly selects a team from among the more commonly appearing teams in the list of similar defects. In the step 220, the process 200 uses the most commonly appearing development team in the list of similar defects. Once the selection of a development team has been made, the process 200 moves from either the step 214, the step 218 or the step 220 to the step 222.

In the step 222, the process 200 determines whether there is an assignment rule (e.g., by checking the rule configuration file) for a specific developer on the selected development team. When no specific developer is to be assigned, the process 200 moves to the step 224. When a specific developer is to be assigned, the process 200 moves to the step 226. In the step 224, the process 200 randomly assigns the current defect to a developer listed on an active list for the selected team. In the step 226, the process 200 assigns the defect to a developer based upon information in the rule file. Once a developer on a team has been assigned to the current defect, the process 200 moves to the step 228 and terminates.

Figure 3:
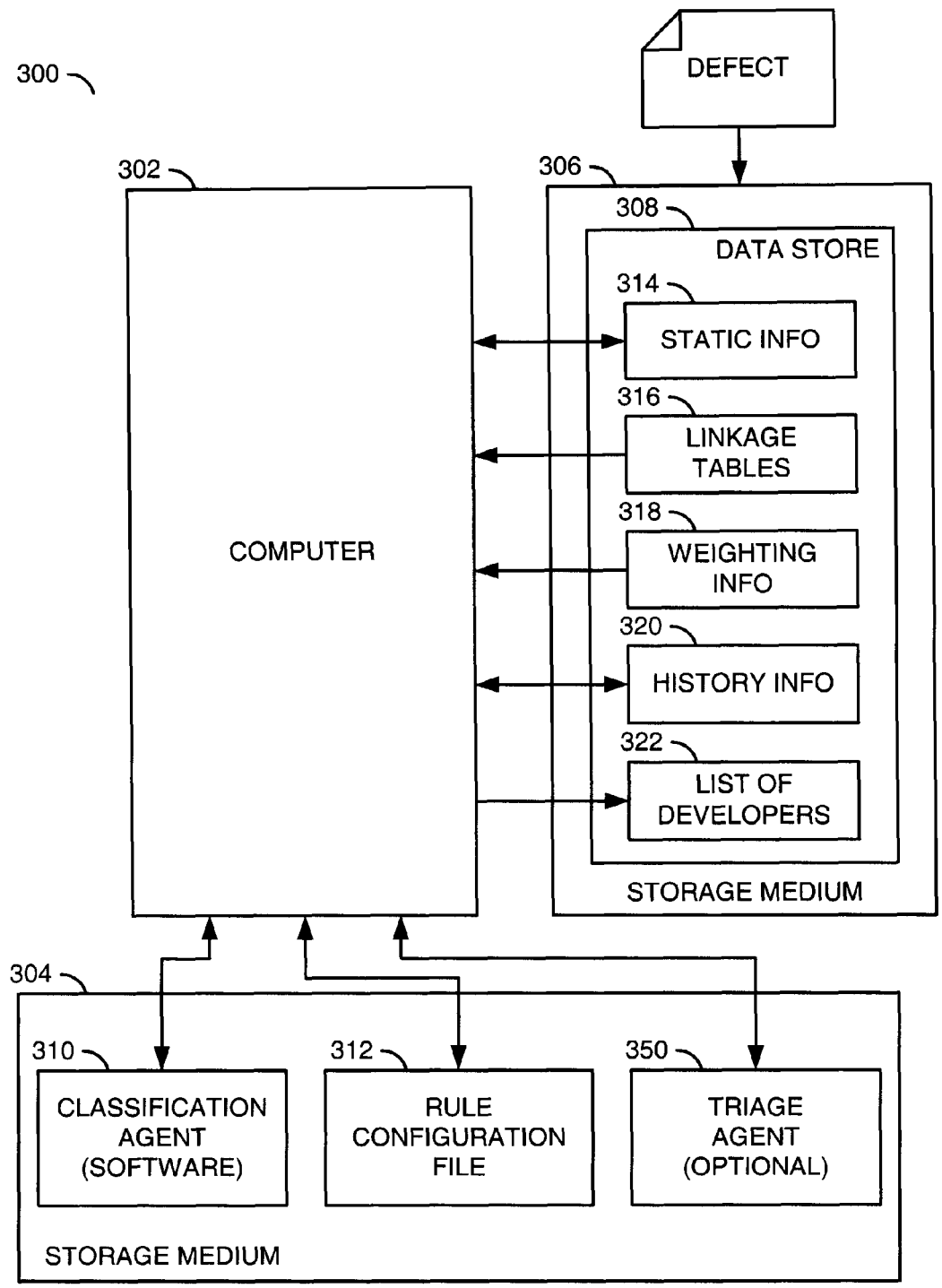
FIG. 3 is a block diagram of a system for implementing processes in accordance with the present invention.

Referring to FIG. 3, a block diagram is shown illustrating a system 300. The system 300 may be configured to implement automatic classification processes in accordance with the present invention. The system 300 may be further configured to implement automatic triage processes in accordance with the present invention. The system 300 may comprise a module 302, a module 304 and a module 306. The modules 302-306 may represent circuits and/or blocks that may be implemented as hardware, software, a combination of hardware and software, or other implementation. The module 302 may be implemented, in one example, as a general purpose computer. The modules 304 and 306 may be implemented, for example, as one or more storage media that are accessible by the module 302. In one example, the module 306 may comprise a data store 308. In one example, the module 304 may store an agent 310 and a rules configuration file (or files) 312. The agent 310 may be implemented, in one example, as an application or software program. The agent 310 may be configured to scan incoming defects into a defect-tracking system and create classification data for the defects. In one example, the defects may comprise files stored in the module 306. The rules configuration file 312 may be configured to instruct the agent on how to classify a defect.

The module 306 may comprise a data store (e.g., a database) that holds classification data for defects. The data store may contain one or more storage areas (e.g., database table(s)). The one or more storage areas of the data store 308 may store information about the defects. The defect information may comprise static defect information 314, such as the information stored in attribute fields of the defect. The defect information may further comprise one or more linking tables 316. The linking tables 316 may contain information defining links between the current defect and other defects. The defect information may further comprise weighting information 318. In one example, the weighting information 318 may be implemented as a weighting field for the linkages defined in the linking tables 316. The weighting information 318 may be generated by the agent 310 to indicate how valuable a linkage is, or how important the linkage is. The defect information may also include one or more tables 320 that may contain history information about the linkages defined in the linkage tables 316. The defect information may further include one or more tables 322 that may hold a list of developers who have resolved or can resolve respective defects.

In one example, the agent 310 may be situated to monitor incoming defects to a defect-tracking system. The term defect as used herein generally refers to information submitted during a development/testing process to initiate action by a development team or developer. Examples of defects may include, but are not limited to, change reports or requests (CRs), engineering change orders (ECOs), defect records, bug reports, problem reports (PRs) and failure reports. In one example, the agent 310 may be operating in the background on a computer system implementing the defect-tracking system. When a defect comes in, the agent 310 examines the contents of the defect, and begins the classification process. Once the classification process is completed, the agent returns to a waiting (or idle) state, until another defect is submitted.

In one example, the classification process may be implemented as in the following example. A new defect comes in, and the classification process starts. The agent 310 extracts all of the relevant attribute fields from the defect. The relevant attribute fields may include, but are not limited to, fields such as the product that the defect was written against, priority, severity, submitter, etc. The field data may be stored in the classification data store 308, and keyed to the defect being processed (e.g., the current defect). The list of fields to be pulled out of the defect may be defined, in one example, in the rules configuration file 312.

When the field data has been extracted from the defect, the agent 310 may perform a keyword/token search of the description and synopsis of the defect. The list of keywords to look for may be in the rules file 312. The list of keywords may also include phrases for which the rate of occurrence (e.g., how often the phrases appear) may be of interest. Also, the agent 310 may automatically extract new keywords/tokens. Selection of a word as a keyword/token may be based, for example, on how frequently the word appears in the description, and whether or not the word is a short, common word (e.g., "it", "on", etc.). Proper nouns, hyphenated phrases and the like may be prime candidates to be automatically converted into keywords. Additional rules may be implemented accordingly to further process the defect. At this point, the agent 310 is generally finished with the raw processing of the defect.

Upon finishing the raw processing, the agent 310 may move to an analysis phase. In the analysis phase, the agent 310 may start by comparing the keywords found in the current defect with keywords found in previous defects. In one example, a rating system may be used in the comparison of defects. Using such a rating system, defects may be located that have several keywords in common. In one example, the rating system may be configured (e.g., customized) based upon information in the rules file 312. A linkage or linkages between the current defect and the previous defects may be created based upon the rating of the defects located. The linkages created may be stored in the data store 308 and a weighting value or values may be assigned. In one example, the more keywords in common, the higher the weighting value assigned to the respective linkage.

When the agent 310 is finished creating linkages and determining weighting values based on the keywords, the agent 310 may compare the current defect and the previous defects based on field information, and again create linkages between the current defect and the previous defects, using a similar system to that described above. The agent 310 may then examine the history information 320 to determine which development team or developer resolved the previous defects. The information about who resolved a particular defect is not generally known to the classification system when the defect is initially being scanned. However, an automated task may be implemented that may run periodically to update the developer/development team information 322 in the classification data store 308. The agent 310 may create linkages between defects and developers/resolvers based on the history of a particular developer in resolving a defect that is similar to the current defect being processed. When the agent 310 is done processing the current defect, the agent 310 generally returns to the waiting (or idle) state, pending the next defect.

The rules configuration file 312 may be implemented, in one example, as a separate text file (e.g., XML, ini, etc.). The rules configuration file 312 may contain instructions on how the agent 310 is to process a defect. The agent 310 may also have access to a default configuration file that may be used when no customizations are made via the rules configuration file 312.

In general, an automatic classification system embodying the present invention may be implemented with a database containing a list of relevant facts/relationships gathered from the defects in the defect-tracking system. An agent generally collects and analyzes the data from the defects, and stores the data in the database. The agent is further configured to create relationships between defects, based on fields, keywords, and assignment history.

Some advantages of an automatic classification system in accordance with the present invention may include: time saved by avoiding manual classification; assignment of a properly-classified defect to appropriate developers without wasting time on reassignment; maintenance of a history of similar defects; identification of defect resolvers for certain defect types for future cross training; classification of defects in a timely manner; and assignment of defects to appropriate developers without too much overhead. In alternative embodiments, the rules that are used by the agent to create the classification data may differ from organization to organization, configuring the rules based on an organization's needs.

In another example, the system 300 may be further configured to utilize the defect information in the data store 308 to automatically route defects to the appropriate developer/development group. The routing of defects to the appropriate developer/development group may be referred to as "triaging" the defects. In one example, an automatic triage agent 350 may be implemented as an application (e.g., software program). In one example, the automatic triage agent 350 may be stored on the storage device 304. In another example, the automatic triage agent 350 may be stored on a server or implemented as a separate system. A separate data store may also be implemented for the automatic triage agent 350.

The automatic triage agent 350 may run in the background (e.g., in an idle state) until a change occurs to the data store 308 (e.g., processing of a new defect). Once a change occurs, the automatic triage system 350 may examine the new defect entry, and determine to whom to route the defect based upon the information in the data store 308 and a set of rules associated with the triage application 350. In one example, the rules associated with the triage agent 350 may be stored in the rules configuration file 312. In another example, the automatic triage system 350 may have a separate rules file from the classification system and establish a separate data store to store the rules, and any additional information collected by the triage system.

In one example, the automatic triage agent 350 may perform the following steps in response to a new defect being entered into the defect-tracking system. In general, the following steps represent a base case example, however additional options that may effect how the system works may be implemented without departing from the scope of the invention.

When a new defect is received, the defect may be processed, for example, according to the classification process 100 (described above in connection with FIG. 1). However, other defect processing may be implemented to meet the design criteria of a particular implementation. After the classification processing of the defect is complete, the automatic triage agent 350 may begin processing the defect. The automatic triage agent 350 may retrieve similarity data compiled for the defect during classification of the defect, and query the data store 308 for other similar defects. For example, the automatic triage agent 350 may inquire, for example, about the top 10 most similar defects, or the top 1% most similar defects. Based on what the most similar defects are, the automatic triage agent 350 may compile a list of development teams to which those defects have been assigned. In general, the data store 308 may maintain a current list of development teams and developers (e.g., the table(s) 322) to which the automatic triage agent 350 may have access.

In one example, the list of development teams generated may comprise a top entry representing the most common development team to which defects similar to the one entered have been assigned. When the list of development teams includes a most common development team, the automatic triage agent 350 may select a developer from the list of current developers. When the list of development teams does not include a most common development team (e.g., a tie exists between teams), the automatic triage agent 350 may choose a team at random among the teams discovered by the system. The developer may be chosen from the team selected at random. Once a team and/or developer have been chosen, the automatic triage agent 350 may assign the current defect to the team/developer and return to an idle state, awaiting the next defect.

In another example, an automatic triage system in accordance with the present invention may implement templates to determine similarity between defects. For example, the rule configuration file for the automatic triage agent 350 may contain a template of a defect that may be used for similar defect comparisons. With the template, the automatic triage agent 350 may be configured to compare the defect being processed to any templates in the data store 308. If the similarity between the defect and a template is high enough, rules attached to the particular template may be used by the automatic triage agent 350 to determine where to route the defect. In one example, the automatic triage agent 350 may be instructed to send certain defects to one particular team (or developer), without looking at similar defects in the defect data store 308.

In another example, the rule configuration file for the automatic triage agent 350 may be configured to list a specific developer for a particular development team that is automatically selected as the developer to whom defects for the particular development team are assigned. For example, the process of selecting a developer from the random choice of an external list of current developers may be changed to selecting a specific developer listed in the rule configuration file of the automatic triage system.

In one example, embodiments of an automatic triage system in accordance with the present invention may include automatic routing of defects to the appropriate developer without the need for human intervention. For example, rules may be implemented that may be configured to (i) look at specific defect types, (ii) route specific defect types to specific teams and/or developers and/or (iii) route defects determined to be going to a given development team to a specific developer.

An advantage of the automatic triage system in accordance with the present invention is the elimination of a need for human intervention in the day-to-day activity of triaging incoming defects. As a result, human resources may be dedicated to other tasks, allowing for the whole development process to be more efficient. In one example, the automatic triage application may be implement in one of any number of languages, and the data store for supporting the application may reside in a relational database, XML file, text file, etc.

The functions performed by the diagrams of FIGS. 1 and 2 may be implemented using a conventional general purpose processor, digital computer, microprocessor, microcontroller, RISC (reduced instruction set computer) processor, CISC (complex instruction set computer) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of automatically classifying defects, the method comprising the steps of:
   receiving information for a current defect;
   extracting field values from the current defect;
   counting a number of occurrences of one or more keywords in the current defect;
   determining one or more new keywords occurring in the current defect and storing the one or more new keywords in a database;
   creating one or more linkages in said database between a first record corresponding to the current defect and one or more second records corresponding to previous defects based upon one or more similarities between the first and the second records; and
   automatically routing the current defect to a particular resolver based upon information associated with the one or more second records linked to said first record regarding resolvers associated with resolution of said previous defects, wherein said method is implemented using a computer.

2. The method according to claim 1, wherein said information for said current defect comprises one or more types of information selected from a group consisting of change requests, change reports, engineering change orders, defect records, bug reports, problem reports and failure reports.

3. The method according to claim 1, wherein said field values are extracted from one or more fields identified in a list of default fields.

4. The method according to claim 1, wherein said field values are extracted from one or more fields identified in a list of user defined fields.

5. The method according to claim 1, wherein said keywords comprise one or more default keywords.

6. The method according to claim 1, wherein said keywords comprise one or more keywords identified in a user-generated configuration file.

7. The method according to claim 1, wherein said new keywords are automatically determined based upon a frequency of occurrence.

8. The method according to claim 1, wherein said linkages are created based upon a rating system.

9. The method according to claim 1, wherein said linkages include a weighting value based upon a number of keywords in common between the current defect and the linked defects.

10. The method according to claim 1, wherein automatically routing the current defect to the particular resolver comprises:
   determining at least one or more development teams that appear in a list of defects similar to the current defect;
   selecting a particular development team to resolve the current defect when the particular development team appears most often in said list, and otherwise randomly selecting one of the development teams appearing in said list to resolve the current defect;
   determining whether an assignment rule is present for the selected development team; and
   when an assignment rule is present, assigning the current defect to a particular developer of the selected development team specified by the assignment rule, and otherwise randomly assigning the current defect to an active developer of the selected development team.

11. A defect classification and handling system comprising:
   a computer readable non-transitory storage medium storing (i) a database of defect information and (ii) a database of rules for classification of defects;
   an agent configured to (i) receive information for a current defect, (ii) generate defect classification information based upon the classification rules, (iii) store the defect classification information in the database, (iv) create linkages between the current defect and one or more previous defects based upon similarities, and (v) automatically route the current defect to a particular resolver based upon information regarding resolvers associated with resolution of the one or more previous defects.

12. The defect classification and handling system according to claim 11, wherein said current defect comprises one or more types of information selected from a group consisting of change requests, change reports, engineering change orders, defect records, bug reports, problem reports and failure reports.

13. The defect classification and handling system according to claim 11, wherein said agent is further configured to extract field values from one or more fields identified in a list of default fields.

14. The defect classification and handling system according to claim 11, wherein said agent is further configured to extract field values from one or more fields identified in a list of user defined fields.

15. The defect classification and handling system according to claim 11, wherein said agent is further configured to determine a number of occurrences of one or more keywords in the current defect.

16. The defect classification and handling system according to claim 15, wherein said keywords comprise one or more keywords identified in a list of default keywords or a user-generated configuration file.

17. The defect classification and handling system according to claim 15, wherein said agent is further configured to automatically determine new keywords based upon a frequency of occurrence.

18. The defect classification and handling system according to claim 11, wherein said agent is further configured to:
   determine at least one or more development teams that appear in a list of defects similar the current defect;
   select a particular development team to resolve the current defect when the particular development team appears most often in said list, and otherwise randomly select one of the development teams appearing in said list to resolve the current defect;
   determine whether an assignment rule is present for the selected development team; and
   when an assignment rule is present, assign the current defect to a particular developer of the selected development team specified by the assignment rule, and otherwise randomly assign the current defect to an active developer of the selected development team.

19. A computer readable non-transitory storage medium comprising instructions which when executed by a computer, are configured to perform the steps of:
   receiving information for a current defect;
   extracting field values from the current defect;
   counting a number of occurrences of one or more keywords in the current defect;
   determining one or more new keywords occurring in the current defect and storing the one or more new keywords in a database;
   creating linkages between the current defect and one or more previous defects based upon similarities; and
   automatically routing the current defect to a particular resolver based upon information associated with the one or more previous defects regarding resolvers associated with resolution of the one or more previous defects.

20. The computer readable non-transitory storage medium according to claim 19, wherein automatically routing the current defect to the particular resolver comprises:
   determining at least one or more development teams that appear in a list of defects similar to the current defect;
   selecting a particular development team to resolve the current defect when the particular development team appears most often in said list, and otherwise randomly selecting one of the development teams appearing in said list to resolve the current defect;
   determining whether an assignment rule is present for the selected development team; and
   when an assignment rule is present, assigning the current defect to a particular developer of the selected development team specified by the assignment rule, and otherwise randomly assigning the current defect to an active developer of the selected development team.

* * * * *